CIRCUIT ARRANGEMENT IN AN AUTOMATIC TELEPHONE SYSTEM FOR RENDERING THE SUBSCRIBER'S NUMBER INDEPENDENT OF HIS LOCATION IN THE SELECTOR MULTIPLE
Filed July 20, 1960 6 Sheets-Sheet 1
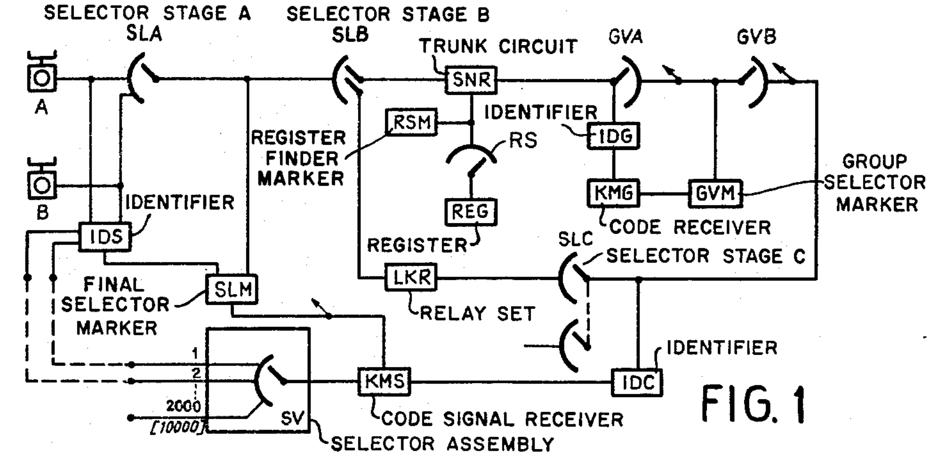
FIG. 1
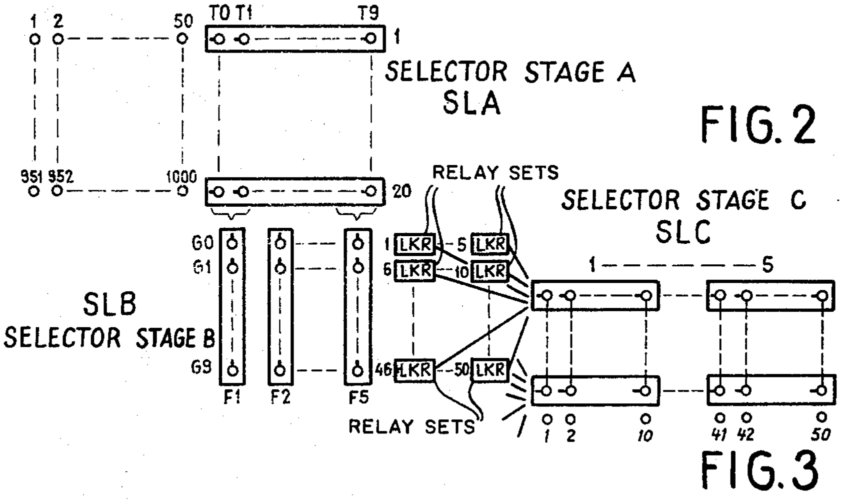
FIG. 2, FIG. 3
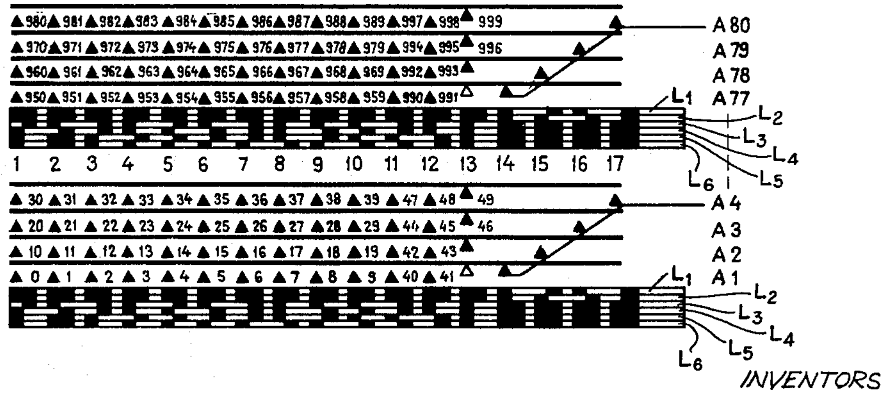
INVENTORS:
KARL GUNNAR BRUNBERG
ROLF AUGUST DAHLBLOM
BERNHARD LILLSUNDE
BY: Hane and Nydick
ATTORNEYS Sept. 7, 1965 K. G. BRUNBERG ETAL 3,205,313

CIRCUIT ARRANGEMENT IN AN AUTOMATIC TELEPHONE SYSTEM FOR RENDERING THE SUBSCRIBER'S NUMBER INDEPENDENT OF HIS LOCATION IN THE SELECTOR MULTIPLE

Filed July 20, 1960 6 Sheets-Sheet 2

INVENTORS:
KARL GUNNAR BRUNBERG
ROLF AUGUST DAHLBLOM
BERNHARD LILLSUNDE
BY: Hane and Nydick
ATTORNEYS Sept. 7, 1965 K. G. BRUNBERG ETAL 3,205,313

CIRCUIT ARRANGEMENT IN AN AUTOMATIC TELEPHONE SYSTEM FOR RENDERING THE SUBSCRIBER'S NUMBER INDEPENDENT OF HIS LOCATION IN THE SELECTOR MULTIPLE

Filed July 20, 1960 6 Sheets-Sheet 3

INVENTORS:
KARL GUNNAR BRUNBERG
ROLF AUGUST DAHLBLOM
BERNHARD LILLSUNDE

BY: Hane and Nydick

ATTORNEYS

CIRCUIT ARRANGEMENT IN AN AUTOMATIC TELEPHONE SYSTEM FOR RENDERING THE SUBSCRIBER'S NUMBER INDEPENDENT OF HIS LOCATION IN THE SELECTOR MULTIPLE

Filed July 20, 1960 6 Sheets-Sheet 4

INVENTORS:
KARL GUNNAR BRUNBERG
ROLF AUGUST DAHLBLOM
BERNHARD LILLSUNDE
BY: Hane and Nydick
ATTORNEYS CIRCUIT ARRANGEMENT IN AN AUTOMATIC TELEPHONE SYSTEM FOR RENDERING THE SUBSCRIBER'S NUMBER INDEPENDENT OF HIS LOCATION IN THE SELECTOR MULTIPLE Filed July 20, 1960 6 Sheets-Sheet 5

INVENTORS:
KARL GUNNAR BRUNBERG
ROLF AUGUST DAHLBLOM
BERNHARD LILLSUNDE
BY: Hane and Nydick
ATTORNEYS Sept. 7, 1965 K. G. BRUNBERG ETAL 3,205,313

CIRCUIT ARRANGEMENT IN AN AUTOMATIC TELEPHONE SYSTEM FOR RENDERING THE SUBSCRIBER'S NUMBER INDEPENDENT OF HIS LOCATION IN THE SELECTOR MULTIPLE

Filed July 20, 1960 6 Sheets-Sheet 6

INVENTORS:
KARL GUNNAR BRUNBERG
ROLF AUGUST DAHLBLOM
BERNHARD LILLSUNDE

BY: Hane and Nydick

ATTORNEYS 3,205,313

CIRCUIT ARRANGEMENT IN AN AUTOMATIC TELEPHONE SYSTEM FOR RENDERING THE SUBSCRIBER'S NUMBER INDEPENDENT OF HIS LOCATION IN THE SELECTOR MULTIPLE

Karl Gunnar Brunberg, Segeltorp, and Rolf August Dahlblom and Bernhard Lillsunde, Hagersten, Sweden, assignors to Telefonaktiebolaget L M Ericsson, Stockholm, Sweden, a corporation of Sweden Filed July 20, 1960, Ser. No. 44,182
3 Claims. (Cl. 179—22)

Figure 4:
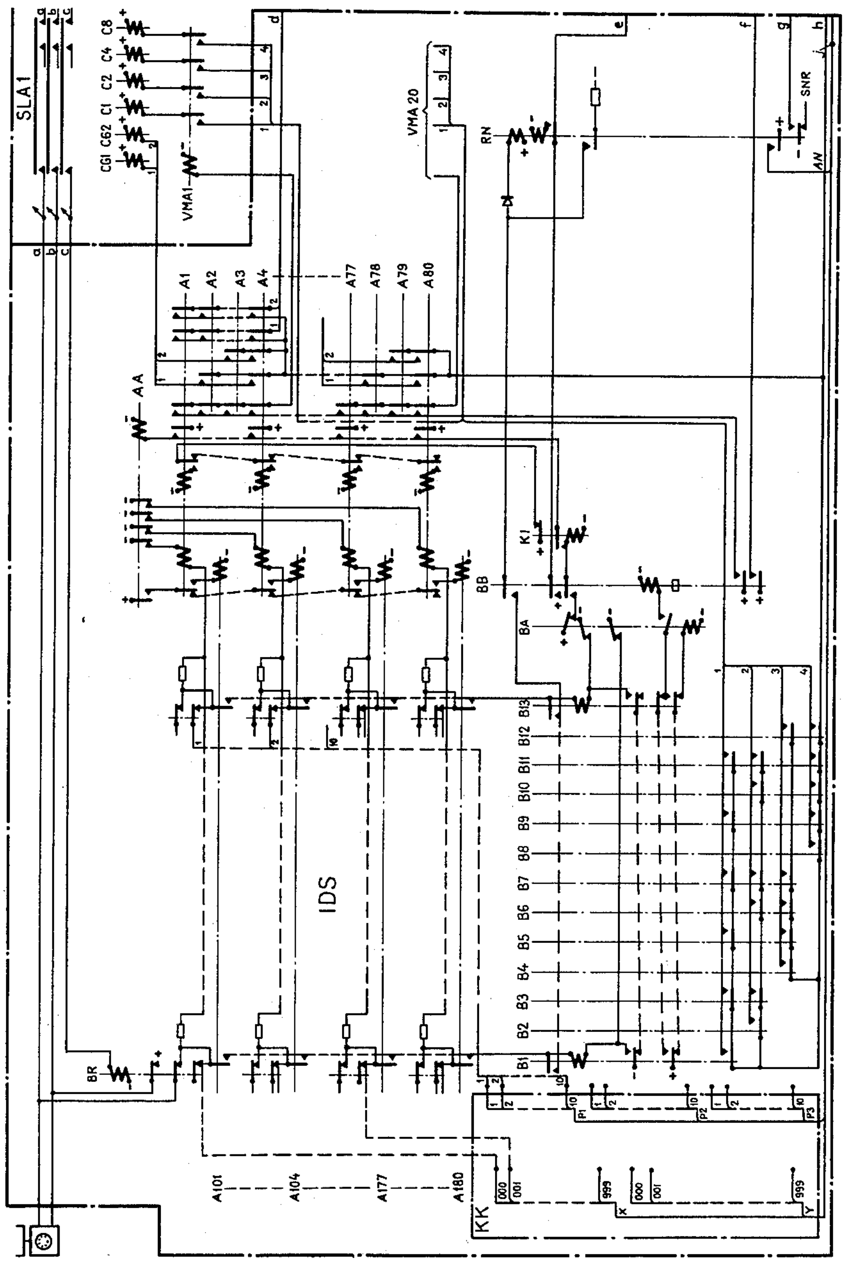

In an automatic telephone system, where a subscriber for the establishment of a connection is identified and by means of a marker is connected through idle selectors to equipment for originating respectively terminating traffic, and where the identifier consists of a system of wires crossing one another, whereby each crossing point of two wires corresponds to a determined subscriber so that two identifying relays, corresponding to respective wires, by their operation identify a subscriber connected to a certain crossing point; and the subscriber's number is dependent upon the location in the selector multiple. Consequently a certain subscriber's line that is identified by a certain location number in the multiple, always has to correspond to a determined subscriber's directory number. Thus, when identifying a number at the establishment of a connection, the identification really relates to a certain location in the subscriber's multiple, a fact that involves certain disadvantages.

The main disadvantage consists in the fact that when a subscriber moves or his telephone for any other reason is shut down and consequently the number must not be used during a certain time, the corresponding subscriber's multiple equipment cannot be used, as it always is the multiple equipment that is identified at terminating calls. Because the number has to be out of use during a certain time, may be six months or more, a great part of the capacity of the telephone exchange is unavailable.

It is earlier known to use a number translator that is accessible from all registers and incoming trunk lines for the translation of the number of a called subscriber in the case, that his line is not located in its original position in the multiple. This number translator has to be consulted in every call in order to facilitate an eventual translation, which means an important complication as well as an increase of costs and an increased switching time for the communication.

The object of the present invention is to eliminate said disadvantages and to obtain a telephone system, at which an arbitrary location number in the multiple may be assigned to any subscriber's number, whereby every subscriber's equipment may be used, even if it corresponds to a telephone lately shut down, the identifying number of which still appears in the directory.

Another advantage of the circuit arrangement according to the invention is the possibility of carrying out regrouping of lines in the selector multiple in accordance with the traffic requirements without having to change any subscriber's number. Furthermore, the circuit arrangement facilities calls to a group number without testing on the individual lines of the group, which is of special importance at calls to PBX-subscribers.

Still another advantage, used for instance in subscriber's switchboards, is that several different numbers may be assigned to the same extension line, whereby different persons, using the same telephone, may have each one an individual telephone directory number. When such a person moves to a room, served by another telephone, no change is required in the directory, the only necessary action being that of changing a simple jumper wire from one terminal to another.

A further advantage of the invention is that in the case of party lines only the multiple equipment of a single line is required, although several telephone numbers are assigned to the same line.

A still further advantage is that the use of the abovementioned facilities is not limited to the capacity of the final selector multiple unit, but may be applied limitless within an exchange number group, covering a plurality of final selector groups. If the capacity of the terminal selector—and the corresponding identifier—is for instance 1000 lines, an arbitrary subscriber's line in any 1000 group may if desired without number change be changed to any other 1000 group. These and other advantages will be understood from the following detailed description.

The circuit arrangement according to the invention is principally characterized by a selector arrangement that is common to the exchange number group and controlled by a code signal receiver, in which selector arrangement each outlet is connectable to any crossing point of any identifier and which arrangement according to a digit information received by the code signal receiver applies a potential to an outlet, corresponding to said digit information, so that at the setting of the selector arrangement to an outlet corresponding to a called subscriber's number, the corresponding subscriber is identified independently of his position in any selector group multiple by the operation of the identifying relays corresponding to the crossing point, to which said outlet is connected, whereby said relays are arranged to indicate the final selector group to which they belong by means of an identifying signal to a marker which controls the setting-up of connections through said final selector group.

The invention will be further described by means of an embodiment with reference to the attached drawing on which FIG. 1 shows an automatic telephone exchange in form of a block diagram, FIG. 2 shows a grouping of the selectors in the SLA-, SLB- and SLC-stages, FIG. 3 shows the location of the contacts in the selector units, and FIGS. 4–8 show a more detailed connection diagram over a telephone system, to which the principle of the invention has been applied.

FIG. 1 shows a lay-out diagram of a telephone exchange with selectors of any type, which is designed as a link system, i.e. with a number of links arranged between inlets and outlets of each selector stage. At the setting up of a connection a subscriber A is connected to the identifier IDS of a marker SLM; the subscriber is identified, whereafter the marker connects the subscriber through idle selectors SLA and SLB to an idle cord-circuit SNR, and through this cord-circuit and a register finder RS to a free register REG that, having received the digits, calls the identifier IDG of a subsequent selector stage GV. IDG identifies the inlet and connects it to the code-receiver KMG, that receives the necessary digit information and connects the GVM-marker to the circuit. GVM selects an idle channel according to the received digit information and calls the identifier IDC of the SLC-stage. This identifier identifies the inlet and connects the code signal receiver KMS to the cord-circuit SNR. KMS receives a convenient number of digits from the register, so that the marker SLM by the received information can complete the connection to the called subscriber. Up to this state the connection process has not differentiated from the process of a connection in a conventional automatic telephone system. At the arrangement according to the invention, however, the code signal receiver KMS preliminarily calls a selector arrangement SV, that is provided with a greater number of outlets than the number of subscribers in the exchange, which selector is set to an outlet corresponding to the information received by KMS. A substantial part of the outlets is connected to crossing points of an identifier IDS, that identifies the crossing point corresponding to the selected outlet, and transmits an identification signal to the SLM-marker. This latter sets up a connection circuit from the inlet of the SLC-stage to a free outlet leading to the terminal selector group where, according to the identification signal, the called subscriber is connected, through a relay set LKR and through the SLB- and SLA-stages to the called subscriber.

FIG. 2 shows diagrammatically an example of the grouping of the selector units and of the relay sets at the use of the principle of the invention on a telephone exchange, equipped with code selectors. The arrangement and function of the code selector are described in Patent 3,060,274. In the arrangement of FIG. 2 the SLC-stage is for the sake of simplicity shown as including 50 inlets, connected in parallel to a number of horizontal rows of code selectors. Each horizontal row consists of 5 code selectors, each containing 10 selector units, the multiples of which are all connected in parallel to 50 SLB-selectors of an individual group of 1000 subscribers through relay sets LKR, permanently connected to the inlets of the SLB-units. The SLB-units are contained in 5 code selectors and have 40 outlets each, multiplied in such a way that the units corresponding to each selector have access to 40 determined SLA-units. The 1000 subscribers of each group are connected to 20 SLA-code selectors, each including 10 units with a common multiple for 50 subscribers. As is understood from the symbolic representation used, an SLB-unit, corresponding to a certain determined SLB-selector, can reach the inlets of the SLA-units located in 2 vertical SLA-selector unit rows of 20 selector units each.

FIG. 3 shows diagrammatically the grouping of the contacts of the selector units of the first and 20th code selector of the SLA-stage. The selector unit of the example has 12 horizontal and 17 vertical contact rows together with 12 contact bars, with which the contacts corresponding to the same horizontal row may be brought into contact. 13 vertical rows contain 50 (theoretically 52) 3-wire outlets, while the 3-wire inlet is connected to a triple contact group in each one of the rows 14–17, so that, by activating one of the vertical rows 1–13 and one of the vertical rows 14–17, the inlet may be brought into contact with one of the 50 outlets. The coherent triple contact group is for the sake of simplicity indicated by a single contact symbol. As each horizontal row contains respectively 12 or 13 contact groups, the subscribers are located in such a way, that the first ten contact groups of the four horizontal rows contain the numbers 0 to 39, while the last two contact groups in horizontal rows 1 and 2 and the last three contact groups of horizontal rows 3 and 4 contain the numbers 40–49. In the same manner number groups 50–00, 100–149 etc. are arranged.

The vertical contact rows are actuated by means of lifting members, which are put in operating position at the operation of the selector unit magnet, that according to the principle of the code selector by the operation renders it possible for the selected contacts to be closed by means of a spring force. Only two of the lifting members can be put simultaneously into the active position by passing through recesses in a number of parallel flat code bars L1 to L6. The recesses in the code bars are indicated in the figure. By lengthwise displacement of selected code bars, continuous slots appear below each of the two desired vertical rows, whereby two lifting members will actuate these contact rows so that a selected inlet may be connected to a desired outlet. The 6 code bars with their recesses are diagrammatically indicated in FIGURE 3, while the code bar magnets, which displace the bars in their longitudinal direction, are not shown. In the position shown in FIG. 3 continuous recesses exist below the vertical rows 13 and 14. This is the home position of the selector unit, in which there is no connection to an outlet, as the contact group, indicated by a non-filled contact symbol, has no outer connection. At the termination of a connection the contacts are held in a closed position by the spring force and may be held in this position, until the selector unit is operated the next time.

FIGS. 4–8 show a telephone exchange including code selectors, in which the principle of the invention is put into practice. Only those parts are shown, which are of importance from the view point of the invention, and it is thus presumed that the setting up of the connection from a calling subscriber occurs in the conventional way through the SLA- and SLB-selectors, the cord circuit SNR and through the GVA- and GVB-selectors until the register is connected through SNR to the SLC-selector in the terminal stage of the called subscriber (FIG. 1). It is apparent that the connection process, that here will be described, is the same independently of whether the call is coming from the same exchange or from another. The register REG receives the digit signals from the subscriber and sends the sufficient digit information to the GV-stage to connect an idle line through the GV-stage to the inlets of the SLC-stage (FIG. 8), whereafter REG sends the remaining digit signals, so that SLM may connect an idle line from the inlet of the SLC-stage to the called subscriber. The GV-stage and REG are not shown on the detailed diagram as they are of no interest from the view point of the invention, and it is presumed that the connection is already established to the inlet of an SLC-unit. This signifies that the test wire of the line is marked with a positive potential. The identifier of the SLC-stage, that is an ordinary single wire identifier, is called. There are 50 incoming lines to the SLC-stage, as shown in FIG. 2, and consequently there are 5 relays A1–A5, corresponding to 5 horizontal wires, and 10 relays B0–B9, corresponding to 10 vertical wires in the identifier. In the first moment one of the A-relays will operate, for instance A1, when inlet No. 1 is called. Secondarily to relay A1 the relay A101 operates, takes holding and changes the circuits to the B-relays. One of the B-relays operates, i.e. the one corresponding to the calling line, in this case B0, whereby the line is identified. The identifier connects the a- and b-wires of the incoming line to a code signal receiver KMS (FIG. 7), that receives the digit signals from the register and transmits answering signals to the register. The signaling between the register and KMS may be effectuated by means of any signal system, but according to the example it is presumed that voice frequency signaling is used. Voice frequency signaling between a sender and a receiver in a telephone system is known in the art, whereby no description of this principle is necessary. As is schematically indicated, KMS includes a receiving part TM, that through a filter F1 and an amplifier FF1 receives digit signals, consisting of two-out-of-five frequencies, whereby two relays out of five frequency sensible relays are operated and in turn cause the operation of two out of five relays for each digit. For the units digits the relay set NU 0, 1, 2, 4, 7, for the tens digits the relay set ND 0,1,2,4,7, and for the hundreds digits the relay set NS 0, 1, 2, 4, 7 is used. In order to simplify the diagram only two relays NT1 and NT2 for the registering of the thousands digit are shown, which however does not imply any limitation as to the use of the invention.

In order to more clearly illustrate the principle of the invention it is supposed that the subscriber 4025 is called. Primarily the digit 4 is transmitted whereby the relays NU4 and NU0 are operated by receiving positive through the wires from the voice frequency receiver TM and negative from break contact on the relay BG. By the operation of relays NU4 and NU0 circuits are closed to the relay NT1 with a positive potential through the contacts on said relays and through the break contacts of relay NT1. The relay NT1 takes holding with a positive potential on the make contact of the relay BB in the identifier IDC, which relay has operated.

As soon as the relay NT1 in KMS has operated, a positive potential is connected to the relay BP, that is operated and held through its holding winding with a positive potential from the voice frequency receiver during the reception of the voice frequency signal of the first digit. The relay BP connects the voice frequencies $f2$ and $f3$ from the voice frequency transmitter to the filter F2 in order to signal to the register that the first digit has been received, and the relay BG operates secondarily to the relay BP. Upon reception of the answering signal the register ceases sending the first digit, whereby the relays NU together with BP release, and the circuit 1 is connected from the contact of relay NT1 to the relay T1. This relay operates and changes the incoming 5 wires to relays NS0–7. The relay T1 being operated, the relay BG releases, so that KMS can receive the second digit. The second digit is zero, which means that the relays NS4 and NS7 through make contacts on T1 and break contacts on T2 and T3.

Thereafter the same process is repeated, as when relay NT1 was operated. NS4 and NS7 take holding with a positive potential on the make contact of relay BD, that operates in the identifier IDC. As soon as the relays NS in KMS are operated, the positive potential is connected to the relay BP, that operates and is held by means of a holding winding with positive potential on the voice ferquency receiver during the time the voice frequency signal of the second digit is received. Relay BP connects the frequencies $f2$ and $f3$ from the voice frequency transmitter to the filter F2 in order to signal to the register that the second digit has been received. The relay BG operates secondarily to BP. Upon reception of the answering signal the register ceases sending the second digit, whereby relays NU and the relay BP release and the circuit 2 is closed from the contacts of the relays NS to the relay T2, whereby this relay operates and changes the incoming five wires to the relays ND0–7. When the relay T2 is operated, the relay BG releases, so that KMS may receive the third digit. The third digit is 2, which signifies that relays NU2 and NU0 will operate and close the corresponding circuits to the relays ND2 and ND0.

Thereafter the process is repeated once more. A positive potential is connected through the contacts of the two operated relays ND and the make contact of the T2-relay to the BP-relay, that operates and is held by the positive potential from the voice frequency receiver through the windings of the NU-relays during the time the signal of the third digit is being received. By operation of the BP-relay an answering signal is sent to the register telling that the third digit has been received, and the answering signal consists as in previous cases of the frequencies $f2$ and $f3$. Upon reception of the answering signal the register ceases sending the third digit. Secondarily to the BP-relay the BG-relay is operated as in the previous case. When the signal from the register ceases, the BP-relay releases, whereby positive potential is connected from contacts on the operated ND-relays through make contacts on BG to the T3-relay, that operates and interrupts the circuits to relays ND, which however are held by their own contacts.

When T3 has operated, the BG-relay releases, and KMS can receive the fourth digit. Two of the NU-relays, according to the example NU1 and NU4, operate as before in correspondence to digit 5. AKM is operated through make contact on the NU- and T3-relays and connects operating potential to the selector arrangement SV, in the embodiment shown as a relay selector, through circuits which are formed through contacts on the operated NT1-relay and the operated NS-, ND-, and NU-relays. The selector SV connects the operating potential to one of 2000 outlets, in the example numbered 4000–4999 and 9000–9999, according to which one of said circuits carries the operating potential. The operating potential is obtained from a voltage source having a higher voltage than the one required for the operation of other relays, for instance 96 volts instead of 48 volts, as used for the other relays or +48 volts if, as is customary, the exchange is connected to 0 (positive) and −48 volts. This higher voltage is through the winding of a relay TK2 and through contacts on relays T1, P3 of the selector SV connected to a make contact on relay AKM, which relay has two additional make contacts connected to normal positive potential. A circuit runs from normal positive potential through one of said make contacts, the contacts of the operated NS-relays and the NT1-relay to one of the 20 relays S1–S20, corresponding to the 20 hundreds groups 4000–4999, 9000–9999 respectively. According to the example chosen the relay S1, that corresponds to the hundreds group 4000–4099, operates as the number called is 4025. Another circuit runs from normal positive potential through the other of said make contacts of AKM, the contacts of the operated ND-relays to one of the 10 wires **1*d*–10*d*, which wire is indicated by the operated ND-relay. The wires 1*d* are connectable to 20 groups of relays, each consisting of 10 relays 1D1–1D10 . . . 20D1–20D10 in dependence on which of the 20 S-relays that is operated. According to the example the tens digit is 2, which means that the wire 2*d* is connected to the positive potential. As the S1-relay already has operated, the wire 2*d* will be connected to the relay 1D2, which operates. A third circuit runs from the contact carrying the higher voltage, through the third make contact of AKM, and the contacts of the operated NU-relays to one of the 10 wires 1*u*–10*u*, which wire is determined by the operated NU-relay. As each one of the 200 D-relays has 10 make contacts, to which said 10 wires may be connected, one of the 2000 outlets is determined by the operation of a certain D-relay and by the potential of one of the wires 1*u*–10*u*. The units digit is 5 according to the example, which means that the wire 5*u*** carries the high voltage, that thus through the corresponding make contacts of the operated 1D2-relay is connected to the outlet corresponding to the subscriber 4025.

Originally the subscriber 4025 is located in the selector SLA1 (FIGS. 3, 4) and is identified by operation of the relays A3, B6. This is easily understood taking into consideration, that it exists a total of 80 A-relays corresponding to the four horizontal rows in each one of the 20 SLA-selectors. The number of B-relays is 13 and they represent the 13 vertical rows of the SLA-selector, these relays together with the 80 A-relays thus defining 1000 crossing points of the identifier. (In certain horizontal rows only 12 contact groups are used, so that the number is exactly 1000.)

When a subscriber lifts his handset and closes the subscriber's loop, his line is identified according to the principle of one-wire identification in the known way, whereby primarily the A-relay corresponding to the horizontal row of the line operates and closes circuits to the B-relays, so that the B-relay corresponding to the vertical row of the line operates. Circuits are closed through contacts of the operated A-respectively B-relays in order to operate the code magnets corresponding to the line.

In the known telephone system the called subscriber is with the conventional identification system used identified by operating the A- and B-relays corresponding to the crossing point, to which the subscriber's line is connected. A determined digit information always results in the operation of a determined A-relay together with a determined B-relay, which means that at the take-down of a subscriber's telephone the corresponding location in the multiple cannot be used without an expensive translating device.

According to the present invention the identification at terminating calls is carried out in such a way, that the outlets (FIG. 4) of the selector SV (FIG. 6) are connected to the crossing points of the identifier in the same way as the subscriber's loops. The connection, however, between these outlets and the crossing points is not permanent; it runs through a distribution frame KK, so that each outlet of the selector SV may be connected to any one crossing point of any identifier and consequently to the subscriber's line, connected to said crossing point. As is mentioned above, the outlets from SV correspond to the subscriber's numbers 4000–4999 and 9000–9999. We may first for the sake of simplicity assume that the telephone exchange has been in service such a short time that all the subscribers have numbers in the number group 4000–4099 and are connected in numerical order to the identifier. To the 1000 crossing points of the identifier are connected the 1000 outlets of the selector SV, that correspond to these same numbers 4000–4999, so that when one of the outlets is marked with positive potential, the crossing point will be identified in the same way as when the subscriber's loop is closed by lifting the handset, whereby primarily the A-relay corresponding to the horizontal row and then the B-relay corresponding to the vertical row operates, according to the principle of one-wire identification. As seen by the FIGURE 4 an outlet from the selector SV is connected to the identifier in exactly the same way as the subscriber's loop in parallel with the same, so that both A- and B-relays operate in the same manner for both originating and terminating calls.

By positive potential on the outlet for 4025 from SV the relay A3 will operate, and secondarily the relay A103 operates and changes all the circuits from the outlets of the selector SV to the B-relays, whereby only the one B-relay corresponding to the crossing point for 4025, i.e. the relay B6, will receive current.

Figure 5:
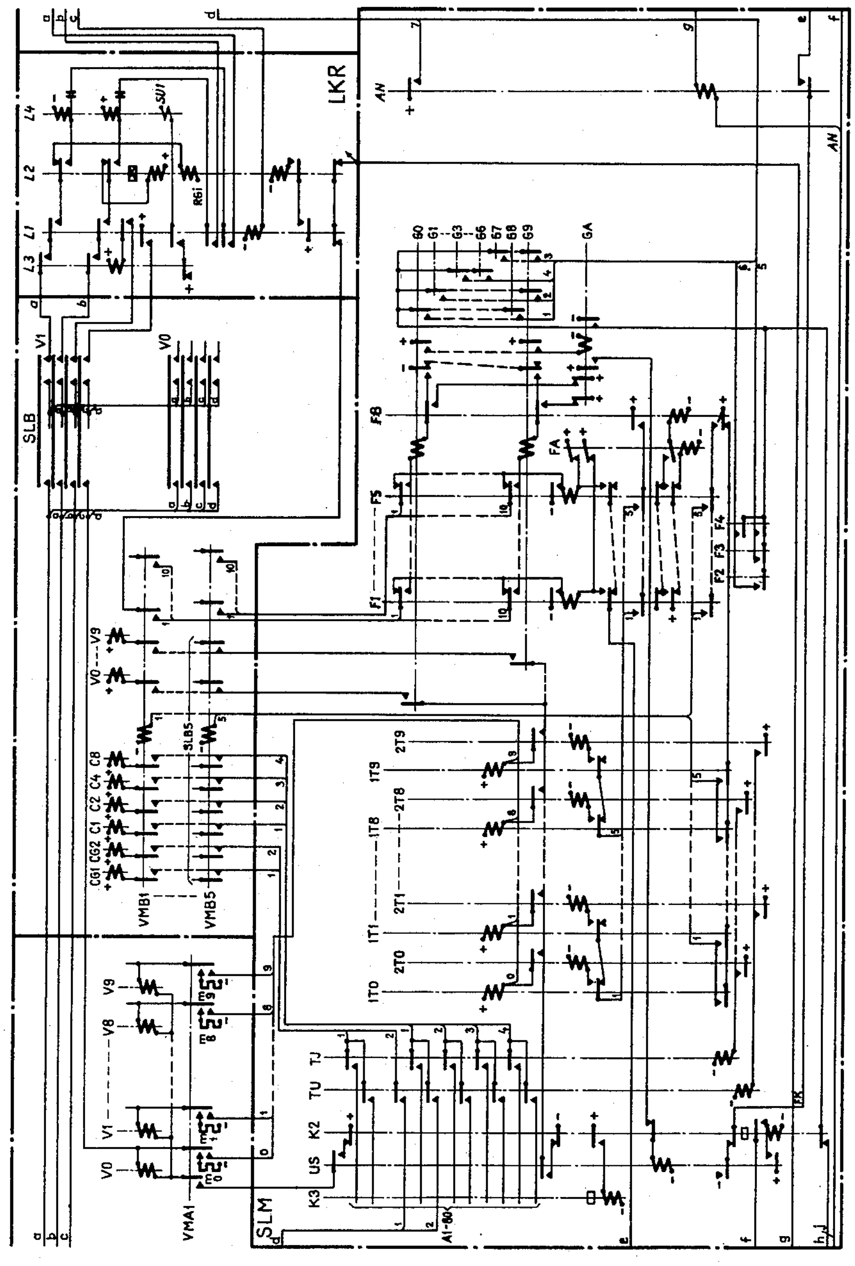

By the operation of the A3-relay it is determined that the subscriber is located in the SL1-selector (FIG. 3), and correspondingly a connection relay VMA1, assigned to this selector, operates (FIG. 4). The connection relay VMA1 connects the test wires of the selector units in the selector SLA1 to the test relays 1T0–1T9 of the marker SLM (FIG. 5). The occupied selector units have positive potential on the test wires, so that these relays cannot operate, while the test wires of the idle selector units have no such polarity, so that they can operate through the resistances *m*0–*m*9. Secondarily to the operation of the relays A and B the relay BA in IDS (FIG. 4) releases and causes the operation of relay BB. Through the make contact of the BB-relay the relay RN reecives the same potential as is connected to the identifying crossing point of the identifier. As has been mentioned earlier, the voltage received in calls from outlets of the selector SV is of the double value compared to the voltage obtained from the subscriber's loop. The identifier functions independently of the voltage connected to a crossing point, but relay RN does not operate with normal positive polarity, i.e. at an originating call but only for the higher potential obtained at a terminating call. By means of the relay RN it is possible to determine whether connection is going to be effectuated to the equipment for originating calls or to the equipment for terminating calls, the change contact of the RN-relay in inactive position connecting circuits for selection of an idle cord-circuit SNR and in active position connecting circuits for selection of an idle LKR-relay set. It is not necessary that the means determining whether the call comes from an outlet of the selector SV or from a subscriber's loop should react for a differentiating voltage. It is possible to use voice frequency signaling or any other convenient signal system to differentiate between originating and terminating calls.

The RN-relay connects a negative potential by one of its make contacts through the identifier, closed contacts of the D-relays (FIG. 6), closed contacts on the digit relays (FIG. 7), the winding of TK2 to +48 v., whereby this latter relay operates and connects the positive potential to the AN-relays. One AN-relay is provided for each 1000 group, and the one will be operated, that receives the positive potential from the other make contact of the RN-relay.

Figure 8:
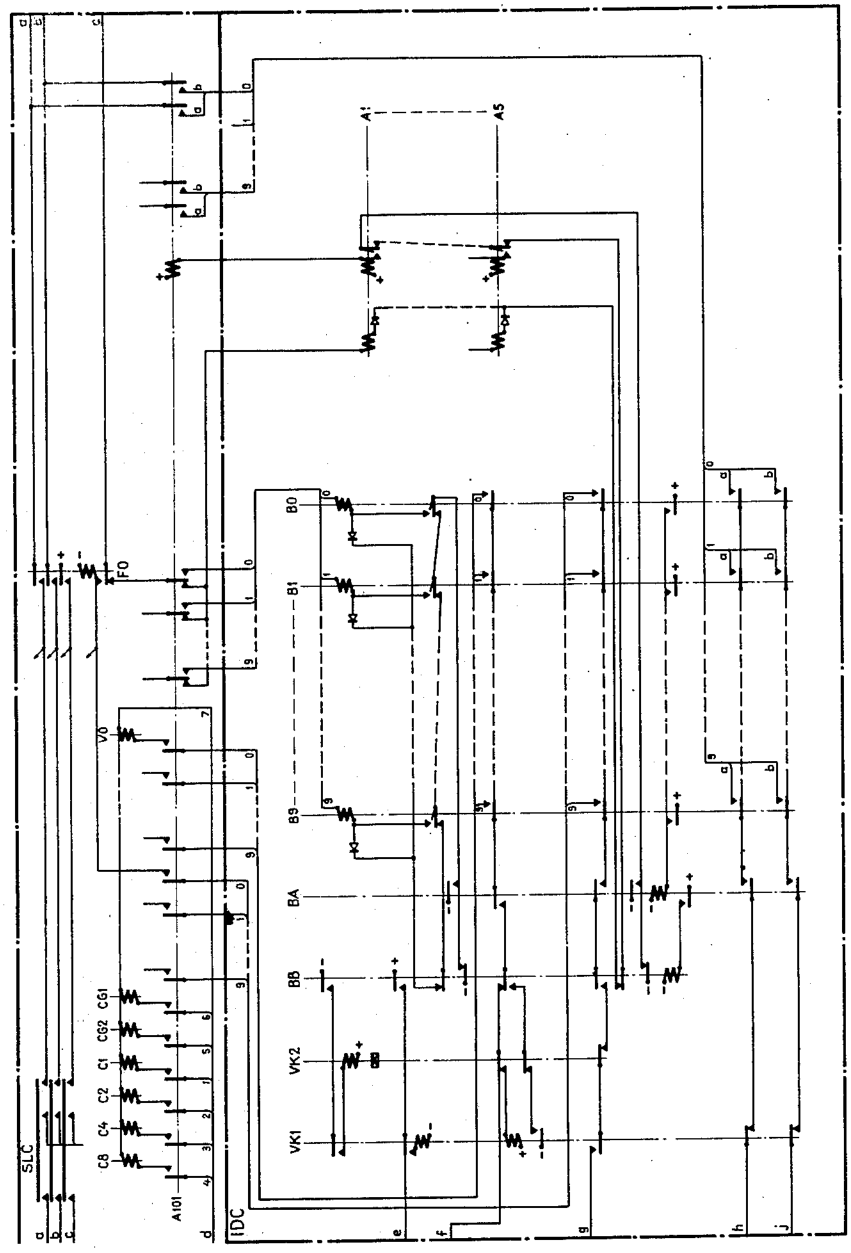

As mentioned above a relay set LKR is connected to the inlet of each SLB-unit. Primarily one or several of the relays F1–F5 operate corresponding to the SLB-selectors, that have idle selector units together with idle relay sets. One of the F-relays is selected when the FA-relay releases. Secondarily the FB-relay is operated, which relay connects the test wires of the selector unit inlets and the respective relay sets, that correspond to the selected SLB-selector, to the ten test relays G0–G9. All the G-relays, corresponding to idle relay sets connected to idle selector units of the selected selector, operate, whereby a G-relay is selected. Thus the relay set and the SLB-unit are determined, and an operating circuit is prepared for the unit magnet. The relays G and F also determine the outlet of the SLC-selector and prepare circuits for operating of code magnets of SLC (FIG. 8). With the positive potential from the make contact of the FB-relay one of the two secondary test relays is operated, for instance 2T1 or 2T2 (FIG. 5) corresponding to the two SLA-units, that can operate with a determined SLB-unit according to the grouping plan. The A- and B-relays of the identifier determine the operating circuits of the code magnets of the SLA-selector with the neagtive potential from the make contacts of the GA-relay (FIG. 5). With the same potential negative the operation of the SLC-code magnets is effected in the 1000 group determined by the positive potential on the contact of the operated AN-relay, as well as the SLB-code magnets, the circuits of which partly depend upon which A-relays have been selected and partly upon whether an SLA-unit is located in an even or odd vertical row according to the grouping plan. This is indicated by operating of the TJ- or TU-relay (FIG. 5) according to which of the two 2T-relays, corresponding to the same SLB-unit, has been selected. The code magnets of all the three selector stages operate.

The operation of the selector units of the SLA- and SLB-selectors is effected by means of the US-relay (FIG. 5), that operates with a positive potential from the make contact of the GA-relay and closes the circuit through a contact on the VMA-relay of the SLA-selector, the magnet of the selected SLA-unit, once more through a contact on the VMA-relay, at the winding of a relay 1T, the make contact of a relay 2T, the contact of the US-relay to negative potential on the break contact of the K2-relay. The operation of the SLC-selector unit is effected by means of the relay VK1 (FIG. 8) that operates with the negative potential from the make contact of the relay US, through the circuit FK, the make contact of the relay BG in KMS, and through contacts on the operated BB-, BA- and B-relays connects negative polarity to the selector unit magnet, which operates with positive potential on the make contact of the AN-relay. The relay VK2 operates secondarily to VK1 and interrupts the circuit to the selector unit magnet, so that now also the SLC-unit is set. Furthermore the VK1-relay connects polarity from the contact of the relay BG to the busy relay F0 of the SLC-units, which relay operates and is held through its own contact with positive potential on the test wire of the incoming line and cuts out this wire from the IDC-identifier, whereby IDC, KMS and SLM are disconnected. The relay F0 (FIG. 8) connects a positive potential to the *c*-wire in the forward direction, whereby the occupation relay L1 (FIG. 5) in the selected relay set is operated and interrupts the test wire for LKR towards the LSM-marker as an indication that it is occupied. The relay L1 connects the relay L3 to the *c*-wire of the SLA-and SLB-selectors, so that, provided the subscriber is disengaged, the BR-relay (FIG. 4) and the L3-relay operate. Furthermore the relay L1 connects positive polarity to the *d*-wire in the forward direction in order to indicate that the SLB- and SLA-units are occupied and the L3-relay connects the *a*- and *b*-wires to the called subscriber. The ringing trip relay L2 is thus connected in the subscriber's loop. When the subscriber answers, the relay LK operates, whereby the called subscriber is connected to the feeding relay L4 and the connection is completed. If the called subscriber is busy, the relay L3 will not operate and busy tone will be sent backwards on the line from the relay L4 in the LKR-relay set.

If the called number is vacant, the outlet of SV is not connected to the identifier IDS, and no circuit can be formed from the TK2-relay to the A-relays of the identifier. If on the contrary the number is jumpered to the identifier, i.e. the number is assigned to a subscriber, said circuit is established through the winding of the relay TK2, through contacts of the NU-relays in the KMS (FIG. 7), the contacts of the D-relays in SV (FIG. 6), the outlets from SV to the windings of the A-relays and the TK2-relay will operate. TK1 is a slow-acting relay, that operates with positive potential through a contact on the operated D-relay in SV and connects positive potential to a change-contact of the relay TK2 which contact, depending upon whether the number is assigned to a subscriber or not, i.e. upon the operated or non-operated condition of relay TK2, connects positive to two alternative circuits LL or LU. In the first mentioned case operation current is connected from the LL-wire to the relay PB through the make contact of the relay T3 (FIG. 7), so that the frequencies $f2$ and $f3$ again are sent back to the register in the same way as at the reception of each one of the digits, the register this time interpreting the frequency combination as an indication that the number has a subscriber. In the other case, the number being vacant, operation current is connected from the LU-wire to the relay BRK through the make contact of the relay T3, so that in this case the frequencies $f1$ and $f2$ are sent back to the register as an indication that the connection can be restored.

If we suppose that the telephone 4025 has been taken down, the position in the multiple can still be used according to the invention. The distribution frame KK, arranged between the 2000 outlets of the selector SV and the 1000 crossing points of either identifier, gives the possibility to connect every outlet to any arbitrary crossing point. Thus there is no obstacle to connecting a new subscriber with for instance the number 9873 to the same crossing point of the identifier, where the subscriber 4025 earlier was connected. At originating calls it is of course of no importance which subscriber is connected to the crossing point in question, as the marker does not require any information regarding the subscriber's number to connect a cord-circuit to the calling subscriber. At a terminating call, for instance to subscriber 9873, the one crossing point will be identified, to which the outlet, in this case that of number 9873, of the selector SV is connected, irrespectively of the location in the multiple, whereby the identification signal of the identifier indicates the number of the final selector group. In this way any position of the contact field may be used for an arbitrary subscriber's number with the possibility, as mentioned above, that the exchange can be dimensioned for the number of working lines excluding the reserve for take-downs, indispensible in the conventional systems.

As is easily understood from the description given, a subscriber's line may be changed to any multiple location within the exchange without changing his directory number, by simply moving his jumper wire to the desired identifier terminal. By adequate running of the jumper wires several directory numbers may also be assigned to a single subscriber, using only a single subscriber's multiple equipment.

Figure 6:
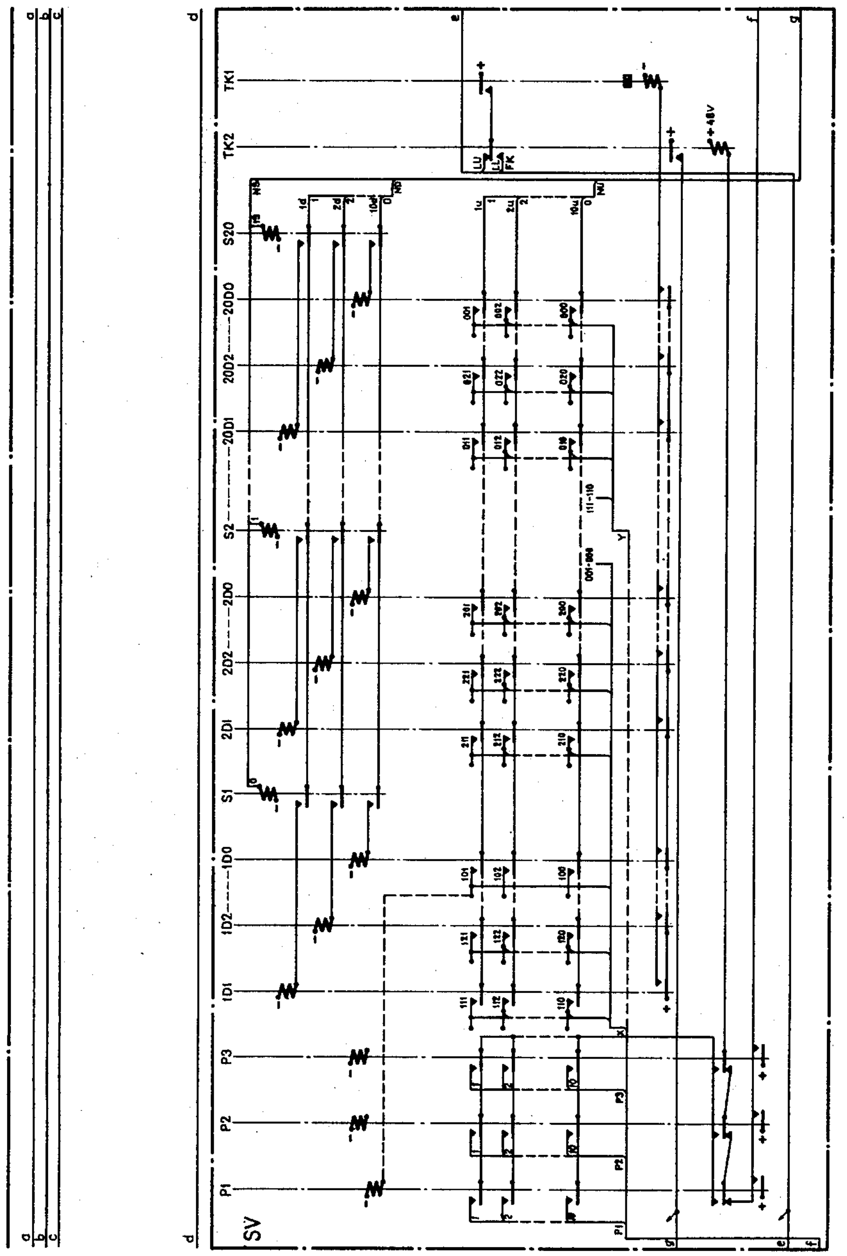
Figure 7:
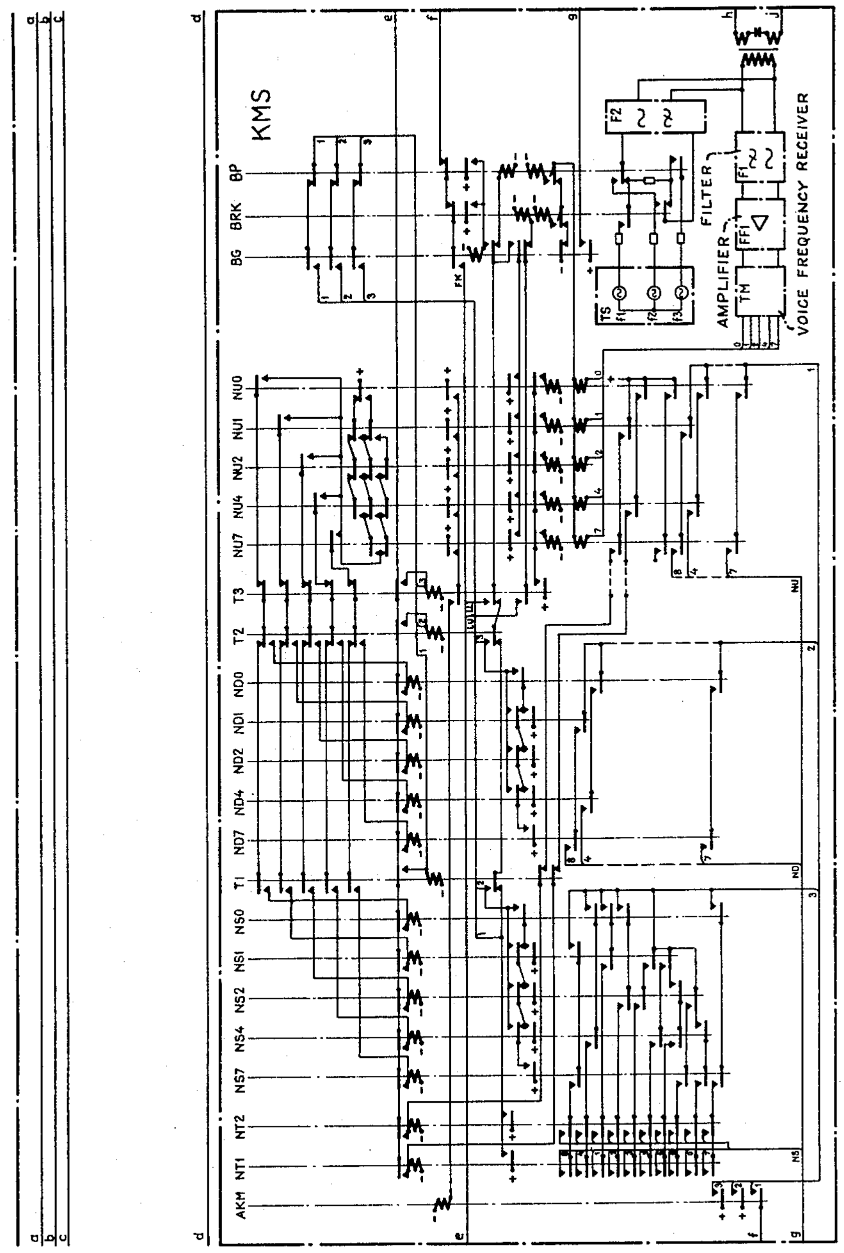

An additional advantage of the invention consists in the fact that in calls to a PBX-subscriber the marker has not, as in the case of conventional systems, to test on the test wires for each one of the lines of the PBX-subscriber in order to subsequently select a free line and identify the same. As seen in FIG. 6 the selector SV comprises a number of relays P1–P3, the windings of which are connected to make contacts on the relays 1D1–20D10 in SV, which correspond to the number of the respective PBX-subscriber. Each P-relay connects in its turn, when operated, the higher voltage of the winding of the TK2-relay to a number of outlets of SV, which correspond to the lines of the PBX-subscriber and which are connected each one to a crossing point of the identifier. If for instance the relay P1 corresponding to the PBX-subscribed 4104 operates, for examples 10 outlets of SV are marked with potential, which outlets are connected to 10 crossing points corresponding to the identifying relays A1–A10 respectively B13. All the A-relays with a free line in their corresponding row will operate, whereby one of the A-relays is selected and the B-relay operated in the usual way. The identification of the line is now ready, and the subscriber is called and connected in the usual way as already described.

As evident the invention provides a great facility not only at the selection of subscriber's numbers but also for making arbitrary changes in the multiple corresponding to the requirement of the traffic without any number changes.

It is evident that the circuit arrangement according to the invention gives a possibility of great savings and simplifications compared to the conventional telephone systems, where subscribers's equipment corresponding to changed numbers cannot be used, where the PBX-number facility requires increased marker equipment, and where changes according to traffic requirement are not possible without additional equipment. The invention is of course not limited to the shown embodiment but can be applied to any telephone system, where the subscriber has to be identified, for instance in a system using cross bar selectors.

We claim:

1. In a telephone system an exchange unit comprising, in combination, a plurality of line-selector groups, each of said groups including a multiple for subscribers' lines and subscribers' lines connected thereto, a plurality of identifiers for said line-selector groups, each of said identifiers including an array of crossing wires, each crossing point of said wires corresponding to a predetermined terminal of a multiple, a plurality of relays each connected to one of said wires in circuits such that the potential condition appearing in response to any of the subscriber's lines being in calling condition causes energizing of a predetermined combination of two of said relays, each of said predetermined combinations being indicative of the multiple line terminal to which the line in calling condition is connected, a marker common to a number of said line-selector groups for controlling the setting up of traffic connections through the line-selector groups included in said number, a number-selector having a plurality of outlets each corresponding to a directory number assigned to said exchange unit, interconnecting means for connecting each one of said outlets of the number-selector to any one of the wire crossing points of any one of said identifiers in a manner such that a potential at an outlet corresponding to a specific one of said directory numbers causes energizing of the same combination of two relays as is energized by a potential appearing at a subscriber's line assigned to said specific directory number, and a receiver means for receiving signals representing digit information constituting part of the directory number of a called subscriber's line, said receiver means being connected in circuit with said number-selector to apply to the outlet corresponding to the directory number of the called subscriber's line a potential energizing the respective combination of relays indicative of the called subscriber's line in the respective identifier, said identifiers being connected with the marker in circuits in which the respective identifier operates the marker to indicate the final selector group to which the respective identifier is connected.

2. An exchange unit according to claim 1 and comprising a terminating traffic connection relays means, and wherein each of said identifiers comprises means for connecting said connection relay means to the marker, said means differentiating between the potential applied to an identifier by a subscriber's line in calling condition and the potential applied from an outlet of said number-selector, and for connecting said connection relay means to the marker only when a potential is applied to the respective identifier from an outlet of a number-selector.

3. An exchange unit according to claim 1 wherein said number-selector comprises means for applying the potential appearing at the outlets of the number-selector to a plurality of terminals each corresponding to a PBX subscriber's line, a plurality of said wire crossing points being marked by said potential, and wherein each of said identifiers comprises means for automatically selecting one of said PBX subscriber's line.

References Cited by the Examiner

UNITED STATES PATENTS

| | | | |
|---|---|---|---|
| 1,794,603 | 3/31 | Friendly | 179—18 |
| 2,341,693 | 2/44 | Clay | 179—18 |
| 2,602,122 | 7/52 | Lesigne | 179—18 |
| 2,957,047 | 10/60 | Wennemer | 179—22 |

ROBERT H. ROSE, *Primary Examiner.*

L. MILLER ANDRUS, WALTER L. LYNDE, *Examiners.*